(12) United States Patent
Abe

(10) Patent No.: US 8,810,366 B2
(45) Date of Patent: Aug. 19, 2014

(54) SERVICE PROVIDING DEVICE, SERVICE PROVIDING METHOD, BIOMETRIC INFORMATION AUTHENTICATION SERVER, BIOMETRIC INFORMATION AUTHENTICATION METHOD, PROGRAM, AND SERVICE PROVIDING SYSTEM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1158 days.

(21) Appl. No.: 12/752,245

(22) Filed: Apr. 1, 2010

(65) Prior Publication Data
US 2010/0253471 A1      Oct. 7, 2010

(30) Foreign Application Priority Data

Apr. 7, 2009   (JP) ................................ P2009-093408

(51) Int. Cl.
*G06F 7/04*       (2006.01)
(52) U.S. Cl.
USPC .......................... 340/5.83; 340/5.82; 340/118
(58) Field of Classification Search
USPC ........... 713/186; 382/118, 117, 124; 715/738; 455/11; 705/41; 340/5.83, 5.82, 5.53
See application file for complete search history.

(56) References Cited

U.S. PATENT DOCUMENTS

| | | | | |
|---|---|---|---|---|
| 6,418,235 | B1 * | 7/2002 | Morimoto et al. | 382/118 |
| 2007/0260887 | A1 * | 11/2007 | Ito | 713/186 |
| 2009/0199105 | A1 * | 8/2009 | Kamada et al. | 715/738 |

FOREIGN PATENT DOCUMENTS

| JP | 2006-260458 | 9/2006 |
|---|---|---|
| JP | 2007-299214 | 11/2007 |

\* cited by examiner

*Primary Examiner* — Steven Lim
*Assistant Examiner* — Kaleria Knox
(74) *Attorney, Agent, or Firm* — Finnegan, Henderson, Farabow, Garrett & Dunner, L.L.P.

(57) ABSTRACT

Provided is a service providing device including a biometric information extraction unit for extracting biometric information, which is information unique to a living body, from living body image data obtained by capturing an image of a part of the living body, an authentication request unit for transmitting the biometric information extracted by the biometric information extraction unit and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information, and a service providing unit for providing a specific service to a user according to an authentication result for the biometric information.

13 Claims, 8 Drawing Sheets

FIG.3

| IDENTIFICATION NO. | SERVICE PROVISION TIME SLOT | | | | |
|---|---|---|---|---|---|
| | EARLY MORNING | MORNING | AFTERNOON | EVENING | NIGHT-TIME |
| 02051 | 1 | 7 | 3 | 0 | 0 |
| 00015 | 0 | 2 | 7 | 2 | 5 |
| 08015 | 0 | 3 | 5 | 2 | 0 |
| 00365 | 7 | 0 | 0 | 3 | 8 |
| 07777 | 1 | 7 | 3 | 0 | 0 |
| 10680 | 5 | 0 | 7 | 0 | 0 |
| 01192 | 0 | 7 | 7 | 7 | 0 |
| ... | ... | ... | ... | ... | ... |

FIG.4

| IDENTIFICATION NO. | AUTHENTICATION SUCCESS DATE | AUTHENTICATION SUCCESS TIME | PURCHASED GOODS 1 | PURCHASED GOODS 2 | ... |
|---|---|---|---|---|---|
| 02051 | 2009/4/1 | 19:38 | SNACK FOOD | SANDWICH | ... |
| 00001 | 2009/4/1 | 07:15 | CIGARETTE | SANDWICH | ... |
| 03028 | 2009/3/31 | 23:45 | ENERGY DRINK | INSTANT FOOD | ... |
| 10569 | 2009/3/31 | 19:53 | BOX LUNCH | ALCOHOLIC BEVERAGE | ... |
| 00108 | 2009/3/31 | 12:03 | BOX LUNCH | BOTTLED DRINK | ... |
| 08008 | 2009/3/31 | 08:53 | SANDWICH | SNACK FOOD | ... |
| 00001 | 2009/3/31 | 07:10 | BOTTLED DRINK | CIGARETTE | ... |
| ... | ... | ... | ... | ... | ... |

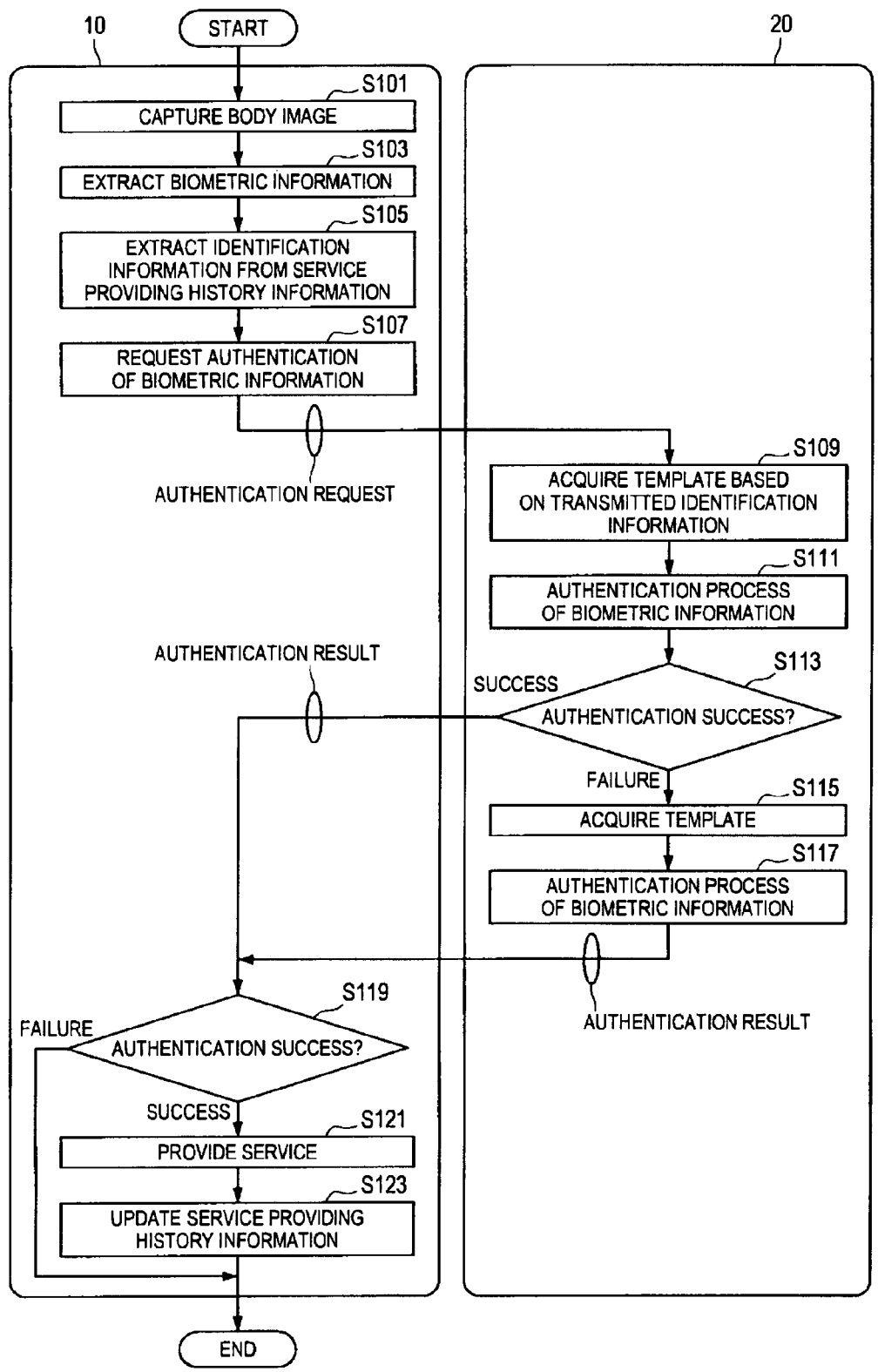

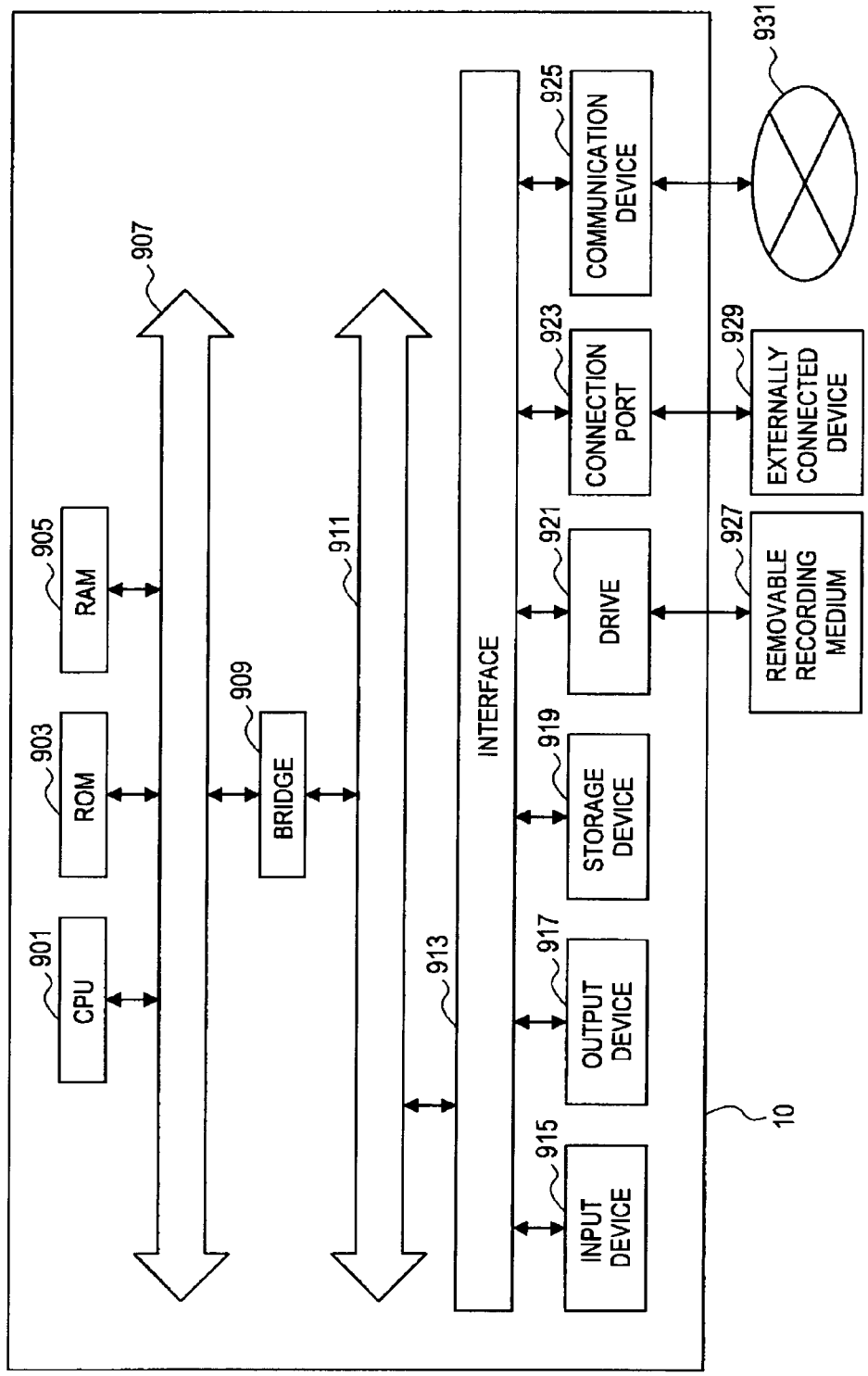

SERVICE PROVIDING DEVICE, SERVICE PROVIDING METHOD, BIOMETRIC INFORMATION AUTHENTICATION SERVER, BIOMETRIC INFORMATION AUTHENTICATION METHOD, PROGRAM, AND SERVICE PROVIDING SYSTEM

BACKGROUND OF THE INVENTION

1. Field of the Invention

The present invention relates to a service providing device, a service providing method, a biometric information authentication server, a biometric information authentication method, a program, and a service providing system.

2. Description of the Related Art

A user who uses biometric authentication, such as fingerprint authentication or vein authentication, that uses biometric information, which is information unique to a living body, registers in a biometric information management server in advance the biometric information of himself/herself as a template. Also, a user who uses the biometric authentication requests a biometric information authentication server to collate biometric information generated at the time of an authentication request with the biometric information that is registered in advance. At this time, the biometric information authentication server has to perform a so-called one-to-N authentication of collating the biometric information for which the authentication request has been issued with all the registered biometric information.

In case of performing such one-to-N authentication that uses processing by a server, it will take a tremendous amount of processing time if the biometric information authentication server performs a process of repeating several times a simple one-to-one authentication. Thus, a desired template has to be extracted from among N templates by narrowing down candidates among N templates that are already registered by using some kind of method and performing authentication to the narrowed down candidates.

Thus, JP-A-2006-260458 discloses a technology of managing, by a server for performing an authentication process, data indicating the collation order of templates generated according to the usage time or usage frequency of a user using the biometric authentication, and thereby narrowing down templates to be collated.

Furthermore, JP-A-2007-299214 discloses an entrance/exit management system which performs one-to-one authentication by obtaining a specific template from an authentication server by using identification information associated with biometric information on, for example, an IC card and which accumulates identification numbers, for which the one-to-one authentication has succeeded, in a different server. Thereby, speeding up of an authentication process is attempted by performing one-to-N authentication using the identification numbers accumulated in the different server for a user for whom the one-to-one authentication has succeeded once, without using an IC card or the like.

SUMMARY OF THE INVENTION

However, the method described in JP-A-2006-260458 has a demerit that, since a server performing the authentication process is to manage the usage time, usage frequency or the like of a user, a burden on the server increases as the number N for collation increases. Also, with a biometric authentication process, the usage of the authentication process differs depending on the installation location or the like of a device to which biometric information is input, and thus, if the collation order is managed monotonously, the collation order might not be put to good use.

Furthermore, the method described in JP-A-2007-299214 has a demerit that if the identification numbers accumulated in the different server increase, one-to-N authentication will have to be performed using a vast number of templates, thereby increasing the processing burden of the server.

In light of the foregoing, it is desirable to provide a service providing device, a service providing method, a biometric information authentication server, a biometric information authentication method, a program, and a service providing system which are capable of performing an authentication process in a shorter time without putting a burden on a server that performs the authentication process.

According to an embodiment of the present invention, there is provided a service providing device which includes a biometric information extraction unit for extracting biometric information, which is information unique to a living body, from living body image data obtained by capturing an image of a part of the living body, an authentication request unit for transmitting the biometric information extracted by the biometric information extraction unit and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information, and a service providing unit for providing a specific service to a user according to an authentication result for the biometric information.

According to this configuration, the biometric information extraction unit extracts biometric information, which is information unit to a living body, from living body image data obtained by capturing an image of a part of the living body. Also, the authentication request unit transmits the biometric information extracted by the biometric information extraction unit and collation order information, which is information relating to an order of collating at least a piece of registered biometric information registered in advance with the biometric information at a time of authentication of the biometric information, to the biometric authentication server for authenticating the biometric information based on the at least a piece of registered biometric information registered in advance, and for requesting the authentication of the extracted biometric information. Also, the service providing unit provides a specific service to a user according to an authentication result for the biometric information.

Preferably, the service providing device further includes a storage unit for storing service providing history information in which identification information for identifying a user to whom a service has been provided and at least one of information relating to time at which the service has been provided and a number of times services have been provided are recorded in association with each other, and an identification information extraction unit for searching through the service providing history information based on a specific condition, and for extracting at least a piece of identification information satisfying the specific condition. The authentication request unit preferably transmits the at least a piece of identification information extracted by the identification information extraction unit to the biometric authentication server as the collation order information.

A history information update unit for updating, in case authentication of biometric information has succeeded, the service providing history information of the identification information associated with the biometric information for which the authentication has succeeded may be further provided.

The identification information extraction unit may search for the identification information in accordance with a frequency of service provision to a user determined based on the service providing history information.

Provided service information, which is information indicating a content of a provided service, may further be associated with the identification information recorded in the service providing history information. The identification information extraction unit may search for the identification information based on the provided service information.

The identification information extraction unit may search for the identification information based on a time slot in which a service provision request was made, and extract the identification information corresponding to a user for whom a service providing frequency in the time slot is high.

According to another embodiment of the present invention, there is provided a service providing method including the steps of extracting biometric information, which is information unique to a living body, from living body image data obtained by capturing an image of a part of the living body, searching through, based on a specific condition, service providing history information in which identification information for identifying a user to whom a service has been provided and at least one of information relating to time at which the service has been provided and a number of times services have been provided are recorded in association with each other, and extracting the identification information satisfying the specific condition, transmitting the extracted biometric information and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and requesting the authentication of the extracted biometric information, and providing a specific service to a user according to an authentication result for the biometric information.

According to another embodiment of the present invention, there is provided a program for causing a computer to realize a biometric information extraction function of extracting biometric information, which is information unique to a living body, from living body image data obtained by capturing an image of a part of the living body, an authentication request function of transmitting the biometric information extracted by the biometric information extraction function and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information, and a service providing function of providing a specific service to a user according to an authentication result for the biometric information.

According to another embodiment of the present invention, there is provided a biometric information authentication server including an authentication request acquisition unit for acquiring an authentication request for biometric information, which is information unique to a living body, from an external device, a template acquisition unit for acquiring at least one template, which is registered biometric information registered in advance to be collated with the biometric information included in the acquired authentication request, based on collation order information, which is information relating to a collation order of the at least one template, included in the authentication request, a biometric authentication unit for performing authentication of the biometric information based on the at least one template transmitted from the template acquisition unit, and an authentication result transmitting unit for transmitting an authentication result by the biometric authentication unit to the external device which has made the authentication request.

The collation order information is at least a piece of identification information for identifying a user. The template acquisition unit preferably acquires, in case the biometric authentication unit has failed in authentication by the template acquired based on the identification information included in the authentication request, a template other than the template corresponding to the identification information. The biometric authentication unit preferably performs authentication of the biometric information by using the template other than the template corresponding to the identification information.

According to another embodiment of the present invention, there is provided a biometric information authentication method including the steps of acquiring an authentication request for biometric information, which is information unique to a living body, from an external device, acquiring at least one template, which is registered biometric information registered in advance to be collated with the biometric information included in the acquired authentication request, based on collation order information, which is information relating to a collation order of the at least one template, included in the authentication request, performing authentication of the biometric information by using the at least one template acquired based on the collation order information, and transmitting an authentication result for the biometric information to the external device which has made the authentication request.

According to another embodiment of the present invention, there is provided a program for causing a computer to realize an authentication request acquisition function of acquiring an authentication request for biometric information, which is information unique to a living body, from an external device, a template acquisition function of acquiring at least one template, which is registered biometric information registered in advance to be collated with the biometric information included in the acquired authentication request, based on collation order information, which is information relating to a collation order of the at least one template, included in the authentication request, a biometric authentication function of performing authentication of the biometric information by using the at least one template acquired based on the collation order information, and an authentication result transmitting function of transmitting an authentication result by the biometric authentication function for the biometric information to the external device which has made the authentication request.

According to another embodiment of the present invention, there is provided a service providing system including a service providing device including a biometric information extraction unit for extracting biometric information, which is information unique to a living body, from living body image data obtained by capturing an image of a part of the living body, an authentication request unit for transmitting the biometric information extracted by the biometric information extraction unit and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information, and a service providing unit for providing a specific service to a user according to an authentication result for the biometric information, and a biometric information authentication server including an authentication request acquisition unit for acquiring an authentication request for the biometric information from the service providing device, a template acquisition unit for acquiring at least one template, which is registered biometric information registered in advance to be collated with the biometric information included in the acquired authentication request, based on collation order information, which is information relating to a collation order of the at least one template, included in the authentication request, a biometric authentication unit for performing authentication of the biometric information based on the at least one template transmitted from the template acquisition unit, and an authentication result transmitting unit for transmitting an authentication result by the biometric authentication unit to the service providing device which has made the authentication request.

According to the embodiments of the present invention described above, an authentication process can be performed in a shorter time without putting a burden on a server that performs the authentication process.

BRIEF DESCRIPTION OF THE DRAWINGS

FIG. 3 is an explanatory diagram for illustrating service providing history information;

FIG. 4 is an explanatory diagram for illustrating the service providing history information;

FIG. 7 is a flowchart for illustrating a service providing method according to the present embodiment; and FIG. 8 is a block diagram for illustrating the hardware configuration of a service providing device according to an embodiment of the present invention.

DETAILED DESCRIPTION OF THE EMBODIMENT(S)

Figure 1:
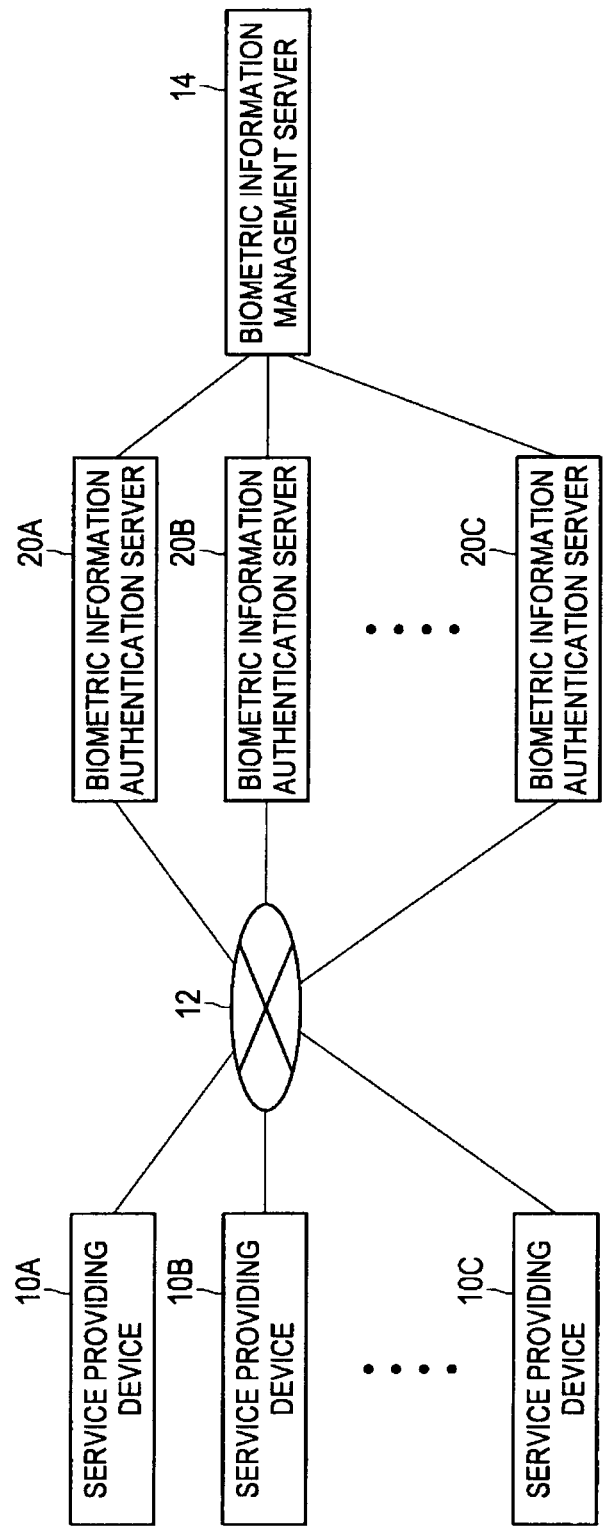
FIG. 1 is an explanatory diagram for illustrating a service providing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the following, an explanation will be given with vein authentication as an example of biometric authentication. However, the present invention is not limited to the vein authentication only, and can be applied to various other biometric authentications, such as fingerprint authentication, face authentication and iris authentication.

Additionally, the explanation will be given in the following order.

(1) First Embodiment
(1-1) Service Providing System
(1-2) Configuration of Service Providing Device
(1-3) Configuration of Biometric Information Authentication Server
(1-4) Service Providing Method
(2) Hardware Configuration of Service Providing Device according to Embodiment of Present Invention
(3) Conclusion
(First Embodiment)
<Service Providing System>

First, a service providing system according to the first embodiment of the present invention will be described in detail with reference to FIG. 1. FIG. 1 is an explanatory diagram for illustrating a service providing system 1 according to the present embodiment.

As shown in FIG. 1, for example, the service providing system 1 according to the present embodiment includes a plurality of service providing devices 10A, 10B, 10C, . . . , and a plurality of biometric information authentication servers 20A, 20B, 20C, . . . . Each service providing device 10 and each biometric information authentication server 20 can communicate with each other via a communication network 12. Furthermore, each biometric information authentication server 20 is capable of connecting to a biometric information management server 14, and performs a biometric authentication process based on templates acquired from the biometric information management server 14.

The service providing device 10 acquires biometric information of a user who is requesting provision of a service, and requests the biometric information authentication server 20 to perform an authentication process on the acquired biometric information. Furthermore, the service providing device 10 provides a service it is capable of providing to a user for whom the authentication of the biometric information has succeeded.

The service providing device 10 may be, for example, an electronic money settlement device of a cash register at a store, a vending machine or the like, an input terminal of an entrance/exit management system of a building, a room or the like, a mobile terminal such as a mobile phone or the like. The service providing device 10 provides various services to a user in accordance with the installation location or the purpose.

The details of this service providing device 10 will be described again later.

The communication network 12 is a communication network for connecting between the service providing device 10 and the biometric information authentication server 20 so as to enable two-way communication or one-way communication. The communication network 12 may be configured from a public communication network or a private communication network. Also, the communication network 12 may be wired or wireless. Examples of the public communication network include, for example, the Internet, a next generation network (NGN), a telephone network, a satellite communication network, a multicasting communication network, and the like. Also, examples of the private communication network include, for example, a WAN, a LAN, an IP-VPN, the Ethernet (registered trademark), a wireless LAN, and the like.

The biometric information management server 14 is a server for managing a template which is biometric information which has been registered in advance by a user of the service providing system 1. The biometric information management server 14 discloses the template that it manages to the biometric information authentication server 20 in response to an acquisition request for a template transmitted from the biometric information authentication server 20.

The biometric information authentication server 20 performs an authentication process on the biometric information transmitted from the service providing device 10. To be more precise, the biometric information authentication server 20 collates the biometric information transmitted from the service providing device 10 with the template acquired from the biometric information management server 14 and performs authentication of the biometric information.

The biometric information authentication server 20 will be described later in detail.

Additionally, although FIG. 1 illustrates a case where the service providing system 1 according to the present embodiment includes three service providing devices 10 and three biometric information authentication servers 20, the number of these devices is not limited to that shown in FIG. 1. Also, although FIG. 1 illustrates a case where the biometric information management server 14 is installed as a device separate from the biometric information authentication server 20, it is not limited to the example shown. That is, the biometric information management server 14 may have the function of the biometric information authentication server 20, or the biometric information authentication server 20 may have the function of the biometric information management server 14.

<Configuration of Service Providing Device>

Figure 2:
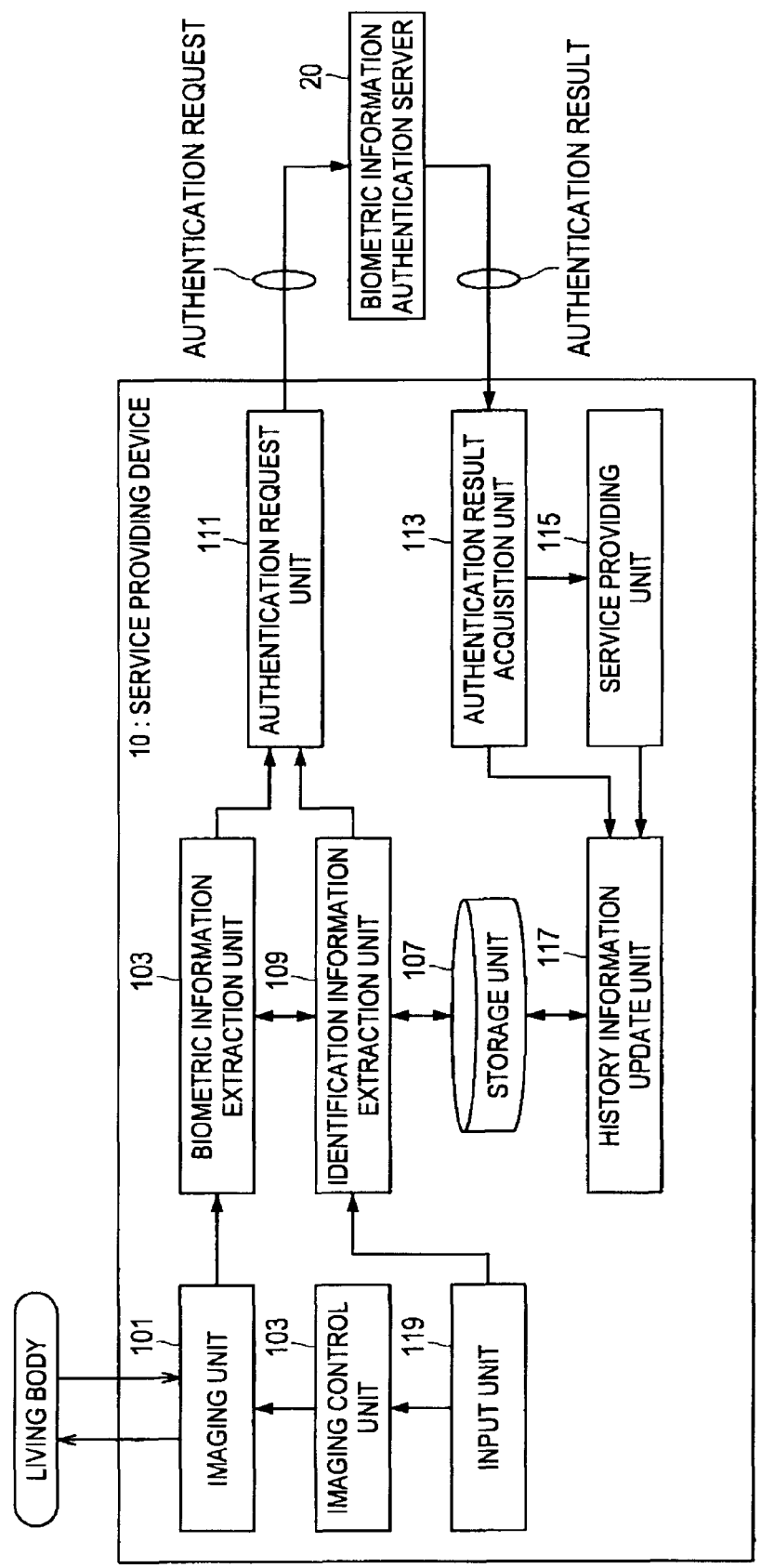
FIG. 2 is a block diagram for illustrating the configuration of a service providing device according to the present embodiment.

Next, with reference to FIG. 2, the configuration of the service providing device 10 according to the present embodiment will be described in detail. FIG. 2 is a block diagram for illustrating the configuration of the service providing device 10 according to the present embodiment.

As shown in FIG. 2 for example, the service providing device 10 according to the present embodiment includes an imaging unit 101, an imaging control unit 103, a biometric information extraction unit 105, a storage unit 107, an identification information extraction unit 109, and an authentication request unit 111. Also, the service providing device 10 includes an authentication result acquisition unit 113, a service providing unit 115, a history information update unit 117, and an input unit 119.

The imaging unit 101 includes a light source (not shown) that emits a near infrared light having a specific wavelength to a body surface such as a finger, and an imaging optical unit (not shown) that captures the near infrared light that passed through the body.

The light source emits a near infrared light in a specific wavelength band to a body surface (for example, a finger surface). The near infrared light has features that, on the one hand, it is highly penetrative, and on the other hand, it is absorbed by hemoglobin (reduced hemoglobin) in the blood. Therefore, when the near infrared light is emitted to a finger, a palm, or the back of a hand, the vein distributed in the finger, the palm, or the back of the hand appears as a shadow in an image. The shadow of the vein appearing in the image is called a vein pattern. In order to favorably image this vein pattern, the light source such as a light emitting diode emits a near infrared light having a wavelength of about 600 nm to 1300 nm, preferably 700 nm to 900 nm.

When the wavelength of the near infrared light emitted by the light source is less than 600 nm or more than 1300 nm, the proportion of the near infrared light absorbed by the hemoglobin in blood decreases, which makes it difficult to obtain a good vein pattern. When the wavelength of the near infrared light emitted by the light source is about 700 nm to 900 nm, the near infrared light is specifically absorbed by both deoxygenated hemoglobin and oxygenated hemoglobin, which enables to obtain a good vein pattern.

Furthermore, instead of using the light source such as the light emitting diode of the wavelength band as described above, it is possible to use a combination of a light emitting diode capable of emitting a light including the above wavelength band and a filter optically restricting the band of the emitted light.

The near infrared light emitted from the light source propagates toward the body surface, and enters the inside of the living body as a direct light through the side surface thereof. A human body is a good scatterer of the near infrared light, and therefore, the direct light that entered the living body propagates while scattering in all directions. The near infrared light transmitted through the living body enters an optical element of the imaging unit.

The imaging optical unit is configured from an optical system configured from an optical element such as a lens and an image sensor such as a charge coupled device (CCD) and a complementary metal oxide semiconductor (CMOS).

The optical system configuring the imaging optical unit includes one or a plurality of optical elements and one or a plurality of image sensors. The optical system of the imaging optical unit according to the present embodiment may be dedicated to vein imaging, and an existing optical system may be used as the optical system for the vein imaging. For example, in case of implementing the service providing device 10 according to the present embodiment in a portable device such as a mobile phone, the optical system already implemented in the portable device can be used as the optical system for vein imaging.

Human skin is known to have a there-layer structure of an epidermal layer, a dermal layer and a subcutaneous layer. The vein layer, where the vein exists, exists in the dermal layer. The dermal layer exists at a position about 0.1 mm to 0.3 mm from the surface of a finger with a thickness of about 2 mm to 3 mm. Thus, by setting the focal position of the optical element such as a lens at the existing position of such dermal layer (for example, at a position of about 1.5 mm to 2.0 mm from the surface of the finger), the light transmitted through the vein layer can be efficiently collected.

The light transmitted through the vein layer, which is collected by the optical element, is focused on the image sensor to be converted into imaged vein data.

The imaging control unit 103 is realized by, for example, a central processing unit (CPU), a read only memory (ROM), a random access memory (RAM), and the like. When a specific control signal is transmitted from the input unit 119 described later, the imaging control unit 103 controls the light source and the imaging optical unit, and generates image data, which is a captured image of a body surface.

The imaging control unit 103 makes the biometric information extraction unit 105 described later output the image data generated by the image sensor. Also, the imaging control unit 103 may record the generated image data in the storage unit 107 described later. Also, at the time of recording in the storage unit 107, the imaging control unit 103 may associate the date or time of capturing the image with the generated image data. Additionally, the generated image data may be an RGB (Red-Green-Blue) signal, or may be imaging data in other colors, gray scale image data, or the like.

Additionally, the imaging optical unit according to the present embodiment may be a so-called transmissive imaging unit that captures the light which has been emitted from the light source and which has been transmitted through the finger, or it may be a so-called reflective imaging unit that captures a reflection light of the near infrared light reflected inside the finger.

The biometric information extraction unit is realized by, for example, a CPU, a ROM, a RAM, and the like. The biometric information extraction unit 105 includes a function of performing, on biometric image data transmitted from the imaging unit 101, pre-processing for extracting vein information which is an example of the biometric information, a function of extracting the vein information, and a function of performing post-processing of the vein information extraction.

Here, the pre-processing described above includes, for example, a process of detecting the contour of a finger from the image data and identifying the position of the finger in the image data, and a process of rotating the image data on a plane by using the detected contour of the finger and correcting the angle of the image data (angle of an captured image).

Also, the above extraction of the vein information is performed by applying a difference filter to the image data for which the detection of the contour or the correction of the angle has been completed, and a vein pattern showing the distribution of veins is extracted as the vein information. In a portion where there is a large difference between a target pixel and pixels around the target pixel, the difference filter outputs a larger value as an output value. In other words, the difference filter is for emphasizing lines and edges in an image by performing calculation using a difference in a gradation value between a target pixel and pixels around the target pixel.

In general, when filter processing is performed with a filter h(x,y) on image data u(x,y) having a lattice point (x,y) on a two-dimensional plane as a variable, image data v(x,y) is generated as shown in Formula 1 below. In Formula 1 shown below, '*' represents a convolution integral.

$$v(x, y) = u(x, y) * h(x, y) \quad \text{(Formula 1)}$$
$$= \sum_{m_1} \sum_{m_2} h(m_1, m_2) u(x - m_1, y - m_2)$$
$$= \sum_{m_1} \sum_{m_2} u(m_1, m_2) h(x - m_1, y - m_2)$$

In the extraction of the vein information according to the present embodiment, a differential filter such as one-dimensional space differential filter and two-dimensional space differential filter may be used as the above difference filter. The one-dimensional space differential filter calculates a difference in a gradation value between a target pixel and pixels laterally and longitudinally adjacent to the target pixel. The two-dimensional space differential filter extracts a portion where the difference in the gradation value of the target pixel varies much.

For example, a Log (Laplacian of Gaussian) filter shown below can be used as the above two-dimensional space differential filter. A Log filter (Formula 3) is represented by a secondary differentiation of a Gaussian filter (Formula 2), i.e., a smoothing filter using the Gaussian function. In Formula 2 shown below, a denotes a standard deviation of Gaussian function, and is a variable representing the degree of smoothing of the Gaussian filter. In the below Formula 3, $\sigma$ denotes a parameter for representing a standard deviation of the Gaussian function as in Formula 2, and an output value in case of performing the Log filter processing can be changed by changing the value of $\sigma$.

$$h_{gauss}(x, y) = \frac{1}{2\pi\sigma^2} \exp\left\{-\frac{(x^2 + y^2)}{2\sigma^2}\right\} \quad \text{(Formula 2)}$$

$$h_{Log}(x, y) = \nabla^2 \cdot h_{gauss}(x, y) \quad \text{(Formula 3)}$$
$$= \left(\frac{\partial^2}{\partial x^2} + \frac{\partial^2}{\partial y^2}\right) h_{gauss}$$
$$= \frac{(x^2 + y^2 - 2\sigma^2)}{2\pi\sigma^6} \exp\left\{-\frac{(x^2 + y^2)}{2\sigma^2}\right\}$$

The above post-processing for the vein information extraction includes, for example, a threshold process, a binarization process, or a thinning process, which is performed on the image data to which the difference filter has already been applied. After such post-processing, a vein pattern can be extracted.

Additionally, a method of detecting an end point, a branching point and a bending point of the vein pattern is not limited to the method described above, and any method can be used.

The biometric information extraction unit 105 transmits to the authentication request unit 111 described later the vein information including information on the vein pattern extracted in this manner. Also, the biometric information extraction unit 105 may store the extracted vein information in the storage unit 107 described later. Additionally, the biometric information extraction unit 105 may store in the storage unit 107 parameters generated for performing each processing described above, the progress of the processing, and the like.

The storage unit 107 stores service providing history information in which identification information for identifying a user to whom a service has been provided and at least either of information on the time the service providing device 10 provided the service and the number of times service has been provided are associated with each other. An example of the identification information for identifying a user to whom a service has been provided may be, for example, a user ID or an identification number assigned in advance to the user.

Identification information which has been authenticated by the biometric information authentication server 20 within a certain period and to which a service has been provided by the service providing device 10 is described in the service providing history information stored in this manner. Thus, by having the biometric information authentication server 20 preferentially authenticate the user corresponding to the identification information described in such service providing history information, the authentication time of a user who has used the service providing device 10 before can be shortened.

In the following, the service providing history information will be described in greater detail with reference to FIGS. 3 and 4.

The service providing history information may include the number of usage times of a user within a specific period (for example, one week or one month) which is recorded in such a way that it is not overlappingly recorded for the same user. Also, the service providing history information may include the usage frequency by the user, the service provision time and the like which is recorded in association with the identification information of a user.

The service providing device 10 will be used differently depending on the installation condition of the service providing device 10, the contents of services to be provided, the usage pattern of users, and the like.

For example, if a service to be provided by the service providing device 10 is to allow entrance to a building or a room, it is assumed that the presence or absence of users, the number of users, or the type of users will change depending on what floor of the building the service providing device 10 is installed, the location of the door, and the like.

Also, a case is assumed where the service providing device 10 is an electronic money settlement device installed in a cash register at a convenience store or the like or in a vending machine or the like. In this case, a user and a usage time are thought to be highly correlated, i.e. a user might user the service providing device 10 nearly everyday at a fixed time, may use the service providing device 10 at lunch time, may use the service providing device 10 during a coffee break at the office, etc. Furthermore, in this case, not only the correlation as described above, but also the correlation between a user and goods that the user purchases may become high (for example, a user regularly buys cigarettes).

Furthermore, a case is assumed where the service providing device 10 is an automatic teller machine (ATM) installed at a bank or the like. In this case, the usage rate of a user who has an account at the branch office at which the service providing device 10 is installed or of a user who has a large amount of deposit, for example, is assumed to become high. Also, it is highly probable that a user uses the service providing device 10 on a fixed date such as a pay day.

Thus, with the service providing device 10 according to the present embodiment, an item to be described in the service providing history information can be set freely, in addition to the items described above, according to the content of the service the service providing device 10 is providing.

As shown in FIG. 3 for example, the service providing history information may be that which divides a day into several time slots and which describes the number of usage times according to the service provision time of providing a service to a user. This makes it possible to grasp the correlation between a user and the service provision time, i.e. which user uses the service providing device 10 frequently at which time slot. Also, the service providing device 10 can also calculate the usage frequency of a user based on such service providing history information.

Also, in case the service providing device 10 is an electronic money settlement device installed at a store, service providing history information as shown in FIG. 4 may be recorded, for example. As shown in FIG. 4 for example, information on date and time the authentication succeeded (i.e. the date and time a service was provided), the identification information for identifying a user, and information on the goods a user purchased are recorded in association with each other in the service providing history information. By creating such service providing history information, the service providing device 10 can use the service providing history information as a database.

Furthermore, in addition to these pieces of data, the storage unit 107 may store as appropriate various parameters which became necessary to be saved at the time of the service providing device 10 performing certain processing, the progress of the processing, or the like, or various databases or the like. The storage unit 107 can be freely read and written by each processing unit of the service providing device 10 according to the present embodiment.

We return to FIG. 2 to describe the identification information extraction unit 109.

The identification information extraction unit 109 is realized by, for example, a CPU, a ROM, a RAM, and the like. The identification information extraction unit 109 searches, based on a specific condition, for the service providing history information which is a type of a database stored in the storage unit 107, and extracts identification information which satisfies the condition.

Figure 5:
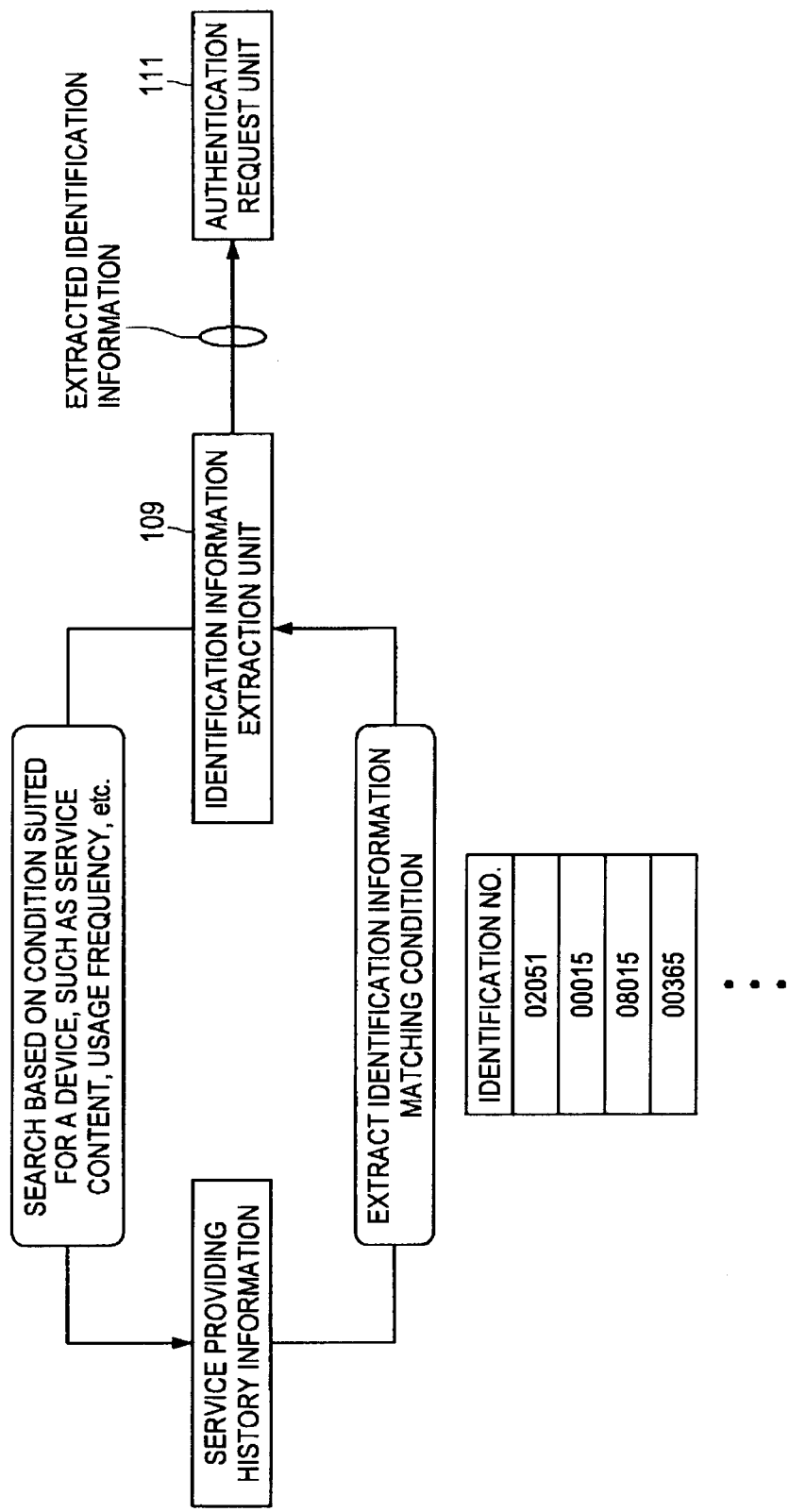
FIG. 5 is an explanatory diagram for illustrating an extraction process for identification information.

As shown in FIG. 5 for example, the identification information extraction unit 109 filters the service providing history information with the content of a provided service, the usage frequency of a user, the time a request for service provision was made, and the like as search conditions, and searches for the identification information that satisfies the conditions. As a result, a series of identification information (for example, identification numbers) are extracted as shown in FIG. 5. The pieces of identification information extracted in this manner indicate users who have used the service providing device 10 under the search conditions, and are made the collation order information which is data indicating the collation order in the service providing device 10.

The condition that the identification information extraction unit 109 uses for searching may be a threshold value of the usage frequency of a user, the time slot of using the service providing device 10, the type of service provided to a user, or a combination of these conditions, for example. By singularly using each of these conditions or by using these conditions by effectively combining them, the identification information extraction unit 109 can efficiently perform filtering on users who are likely to use the service providing device 10.

The identification information extraction unit 109 transmits a plurality of pieces of identification information extracted in this manner to the authentication request unit 111. As described later, the authentication request unit 111 transmits the plurality of pieces of identification information extracted in this manner to the biometric information authentication server 20 together with the biometric information that was extracted, and the biometric information authentication server 20 preferentially performs authentication on the transmitted identification information. By adopting such method, the service providing device 10 according to the present embodiment can preferentially provide a service to a user who has satisfied a certain condition.

In the following, the function of the identification information extraction unit 109 will be described by introducing concrete examples.

For example, the identification information extraction unit 109 of an electronic money settlement device installed at a store searches through the service providing history information under a condition "previously purchased cigarettes," in case there is a user who is trying to buy cigarettes. It is highly probable that identification information corresponding to the user who is trying to buy cigarettes is included in the pieces of identification information extracted in this manner.

Furthermore, not only the search condition relating to the goods that is to be purchased, but also conditions such as date, day of a week, a time slot, and the like, can be combined.

As a result, the number of N for the collation can be made smaller than the usual one-to-N authentication, and if a user who is trying to receive service provision has used the service providing device 10 in the past, the waiting time for the user can be shortened.

Furthermore, in case of a service providing device 10 with many so-called regular customers, the identification information extraction unit 109 extracts identification information from the service providing history information with a service providing frequency as the search condition. Many pieces of identification information corresponding to the regular customers will be included in the pieces of identification information extracted in this manner, and by using these pieces of extracted information, the authentication time for the regular customers can be reduced.

Furthermore, even in case the service providing device 10 is a mobile terminal such as a mobile phone that an individual possesses, the authentication time of the user can be shortened by setting a search condition of whether or not authentication of the user has succeeded in the past. Thereby, an environment can be constructed in which server authentication can be freely performed with any terminal, without associating a mobile terminal with the biometric information.

We return again to FIG. 2 to describe the authentication request unit 111.

The authentication request unit 111 is realized by, for example, a CPU, a ROM, a RAM, a communication device, and the like. The authentication request unit 111 transmits, in association with each other, the biometric information (for example, vein information) transmitted from the biometric information extraction unit 105 and the collation order information, which is information relating to the order of collation between the biometric information to be authenticated and templates, to the biometric information authentication server 20, and requests for the authentication of the biometric information. An example of the collation order information is the identification information transmitted from the identification information extraction unit 109. Also, the authentication request unit 111 may transmit, together with these biometric information and identification information, information for identifying the service providing device 10 to which the authentication request unit 111 belongs.

The authentication result acquisition unit 113 is realized by, for example, a CPU, a ROM, a RAM, a communication device, and the like. The authentication result acquisition unit 113 acquires authentication result information, which is information indicating an authentication result transmitted from the biometric information authentication server 20. Also, in case the authentication result included in the authentication result information indicates an authentication success, the authentication result acquisition unit 113 transmits to the service providing unit 115 described later a notification that the authentication has succeeded. Also, in case identification information (for example, a user ID, an identification number, or the like) for which the authentication has succeeded was included in the authentication result information, the authentication result acquisition unit 113 transmits to the history information update unit 117 the identification information for which the authentication has succeeded and time information relating to the date and time of the authentication success.

Also, in case the authentication result included in the authentication result information indicates an authentication failure, the authentication result acquisition unit 113 displays on a display (not shown) of the service providing device 10 that the authentication has failed, and ends the service providing process.

The service providing unit 115 is realized by, for example, a CPU, a ROM, a RAM, an output device, and the like. In case the service providing unit 115 is notified by the authentication result acquisition unit 113 that the authentication of biometric information has succeeded, the service providing unit 115 provides, to the user corresponding to the template matching the biometric information for which the authentication has succeeded, the service which is to be provided by the service providing device 10 to which the service providing unit 115 belongs.

Furthermore, in case the service providing device 10 according to the present embodiment has the information relating to the content of the provided service described in the service providing history information, the service providing unit 115 transmits the content of the service provided to the user to the history information update unit 117.

The history information update unit 117 is realized by, for example, a CPU, a ROM, a RAM, and the like. In case the authentication of biometric information has succeeded, the history information update unit 117 updates the content of the service providing history information of the identification information associated with the biometric information for which the authentication has succeeded. Also, in case corresponding identification information does not exist in the service providing history information, a column for this identification is newly created. Also, in case a column relating to the usage frequency of corresponding identification information exists in the service providing history information, the history information update unit 117 recalculates the usage frequency of the corresponding identification information, and updates the content. Thereby, the service providing device 10 according to the present embodiment can construct service providing history information reflecting the situation of itself, the customer stratum, the mode of usage, and the like, and can create collation order data best suited for itself.

The input unit 119 is realized by, for example, a CPU, a ROM, a RAM, an input device, and the like. In case an input requesting provision of a service is input via a specific input device, the input unit 119 transmits a signal for starting the image-capturing of a body to the imaging control unit 103, and a signal for starting the extraction process for identification information to the identification information extraction unit 109. The imaging control unit 103 and the identification information extraction unit 109 starts the processes with the control signals transmitted from the input unit 119 as the triggers.

Heretofore, an example of the configuration of the service providing device 10 according to the present embodiment has been shown. Each of the structural elements described above may be configured using a general-purpose material or a general-purpose circuit, or may be configured from hardware dedicated to the function of each structural element. Also, a CPU or the like may perform all the functions of the structural elements. Accordingly, the configuration to be used can be changed as appropriate according to the technical level at the time of carrying out the present embodiment.

Additionally, a computer program for realizing each function of the service providing device 10 according to the present embodiment as described above can be created, and the computer program can be implemented in a personal computer or the like. A recording medium in which such computer program is stored and which can be read by a computer can also be provided. The recording medium is a magnetic disk, an optical disk, a magneto-optical disk, a flash memory, or the like, for example. Also, the computer program may be distributed via a network, for example, without using a recording medium.

<Configuration of Biometric Information Authentication Server>

Figure 6:
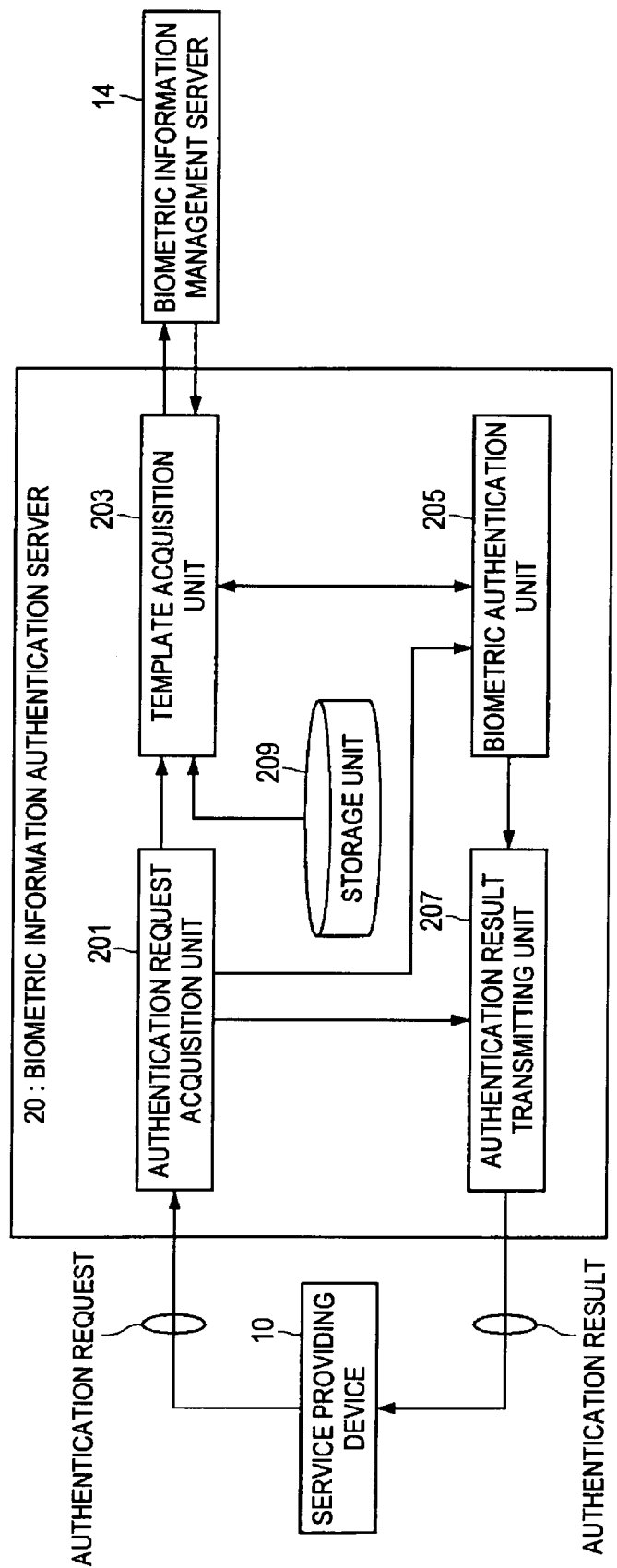
FIG. 6 is a block diagram for illustrating the configuration of a biometric information authentication server according to the present embodiment.

Subsequently, the configuration of the biometric information authentication server 20 according to the present embodiment will be described in detail with reference to FIG. 6. FIG. 6 is a block diagram for illustrating the configuration of the biometric information authentication server 20 according to the present embodiment.

As shown in FIG. 6 for example, the biometric information authentication server 20 according to the present embodiment mainly includes an authentication request acquisition unit 201, a template acquisition unit 203, a biometric authentication unit 205, an authentication result transmitting unit 207, and a storage unit 209.

The authentication request acquisition unit 201 is realized by, for example, a CPU, a ROM, a RAM, a communication device, and the like. The authentication request acquisition unit 201 acquires an authentication request transmitted from the service providing device 10. The biometric information to be authenticated and the collation order information, which is information relating to the collation order of the templates that are to be collated with the biometric information, are included in the authentication request. The authentication request acquisition unit 201 transmits the pieces of identification information, which is an example of the collation order information, included in the acquired authentication request to the template acquisition unit 203 described later, and transmits the biometric information included in the acquired authentication request to the biometric authentication unit 205 described later. Furthermore, in case information (for example, a URL or the like) for identifying the service providing device 10 which has transmitted the authentication request is attached to the authentication request, the authentication request acquisition unit 201 transmits this information to the authentication result transmitting unit 207 described later.

The template acquisition unit 203 is realized by, for example, a CPU, a ROM, a RAM, a communication device, and the like. The template acquisition unit 203 acquires, from the biometric information management server 14, templates corresponding to the pieces of identification information based on the pieces of identification information, which is an example of the collation order information and which has been transmitted from the authentication request acquisition unit 201. When the templates corresponding to the pieces of identification information are acquired, the template acquisition unit 203 transmits the acquired templates to the biometric authentication unit 205 described later.

In case the template acquisition unit 203 is notified by the biometric authentication unit 205 described later that the biometric information does not match any of the templates corresponding to the pieces of identification information transmitted from the authentication request acquisition unit 201, the template acquisition unit 203 performs the following processes. Specifically, the template acquisition unit 203 acquires from the biometric information management server 14 templates other than the templates corresponding to the pieces of identification information that were included in the authentication request, and transmits again the templates to the biometric authentication unit 205.

As described, the template acquisition unit 203 according to the present embodiment first acquires templates corresponding to the pieces of identification information which are included in the authentication request and for which collation process is to be performed preferentially, and makes the biometric authentication unit 205 perform the collation process based on these templates. Also, in case authentication using these templates failed, the template acquisition unit 203 acquires templates other than the templates corresponding to the pieces of identification information included in the authentication request to have usual one-to-N authentication performed.

The biometric authentication unit 205 is realized by, for example, a CPU, a ROM, a RAM, and the like. The biometric authentication unit 205 performs authentication of transmitted biometric information based on vein information which is the biometric information transmitted from the authentication request acquisition unit 201 and the templates transmitted from the template acquisition unit 203. The biometric authentication unit 205 according to the present embodiment performs a two-step authentication process as described later.

First, the biometric authentication unit 205 performs an authentication process on biometric information based on templates that were transmitted first from the template acquisition unit 203. These templates are templates corresponding to the pieces of identification information transmitted from the service providing device 10, and they correspond to the pieces of identification information extracted by the identification information extraction unit 109 of the service providing device 10 from the pieces of identification information of the users of the service providing device 10 based on a specific condition. These templates relate to users for whom the authentication process is desired by the service providing device 10 to be preferentially performed, and include many templates which are likely to match the biometric information for which an authentication request has been made. Thus, by preferentially collating these templates, the biometric authentication unit 205 might be able to shorten the waiting time of the user of the service providing device 10.

Also, in case the collation of the templates that were transmitted first from the template acquisition unit 203 failed, the biometric authentication unit 205 notifies the template acquisition unit 203 that the authentication of the templates has failed. Then, as described above, the template acquisition unit 203 acquires from the biometric information management server 14 templates other than the templates transmitted first, and transmits the templates to the biometric authentication unit 205. Then, the biometric authentication unit 205 performs the authentication process of the biometric information by using the templates that are transmitted second from the template acquisition unit 203.

Here, comparison between the biometric information (for example, vein information) included in a template and the transmitted biometric information is made possible by calculating a correlation coefficient as shown below and performing the comparison based on the calculated correlation coefficient.

The correlation coefficient is defined by Formula 4 shown below, and is a statistical index representing the degree of similarity between two pieces of data f1 and f2. The correlation coefficient is a real number from −1 to 1. When the correlation coefficient has a value close to 1, the two pieces of data are similar. When the correlation coefficient has a value close to 0, the two pieces of data are not similar. When the correlation coefficient has a value close to −1, the two pieces of data have values of opposite sign.

In this specification, f1 and f2 are data representing vein information (vein patterns), and have an image size of M rows by N columns. It is assumed that a pixel in each piece of the vein information is represented as (m, n).

$$S(f1, f2) = \frac{\sum_{m=0}^{M-1}\sum_{n=0}^{N-1} f1(m,n) \cdot f2(m,n)}{\sqrt{\left\{\sum_{m=0}^{M-1}\sum_{n=0}^{N-1} f1(m,n)^2\right\}} \sqrt{\left\{\sum_{m=0}^{M-1}\sum_{n=0}^{N-1} f2(m,n)^2\right\}}} \quad \text{(Formula 4)}$$

The biometric authentication unit 205 decides that the authentication of the transmitted biometric information has succeeded in case the biometric information included in a template and the transmitted biometric information are found to be similar as a result of the determination based on the threshold value of the correlation coefficient. Also, the biometric authentication unit 205 decides that the authentication has failed in case the transmitted biometric information is not similar to the template.

The biometric authentication unit 205 transmits the final authentication result to the authentication result transmitting unit 207 described later. Also, in case the authentication has succeeded, the biometric authentication unit 205 transmits to the authentication result transmitting unit 207 the identification information with which the template matching the biometric information is associated.

The authentication result transmitting unit 207 is realized by, for example, a CPU, a ROM, a RAM, a communication device, and the like. The authentication result transmitting unit 207 transmits the authentication result transmitted from the biometric authentication unit 205 to the service providing device 10. Also, in case the identification number of the template for which the authentication has succeeded was transmitted from the biometric authentication unit 205, the authentication result transmitting unit 207 transmits the identification number by including the same in the information indicating the authentication result.

The storage unit 209 may store as appropriate various parameters which became necessary to be saved at the time of the biometric information authentication server 20 performing certain processing, the progress of the processing, or the like, or various databases or the like. The storage unit 209 can be freely read and written by each processing unit of the biometric information authentication server 20 according to the present embodiment.

Also, in case the biometric information authentication server 20 according to the present embodiment has the function of the biometric information management server 14, a template registered in advance by a user of the service providing system 1 may be stored in the storage unit 209 in association with the identification information of the user.

Heretofore, an example of the function of the biometric information authentication server 20 according to the present embodiment has been shown. Each of the structural elements described above may be configured using a general-purpose material or a general-purpose circuit, or may be configured from hardware dedicated to the function of each structural element. Also, a CPU or the like may perform all the functions of the structural elements. Accordingly, the configuration to be used can be changed as appropriate according to the technical level at the time of carrying out the present embodiment.

Additionally, a computer program for realizing each function of the biometric information authentication server 20 according to the present embodiment as described above can be created, and the computer program can be implemented in a personal computer or the like. A recording medium in which such computer program is stored and which can be read by a computer can also be provided. The recording medium is a magnetic disk, an optical disk, a magneto-optical disk, a flash memory, or the like, for example. Also, the computer program may be distributed via a network, for example, without using a recording medium.

<Service Providing Method>

Next, a service providing method according to the present embodiment will be described in detail with reference to FIG. 7. FIG. 7 is a flowchart for illustrating the service providing method according to the present embodiment.

First, when an input requesting the start of service provision is input to the input unit 119 of the service providing device 10 according to the present embodiment, the input unit 119 transmits a specific control signal to the imaging control unit 103. As a result, the imaging control unit 103 controls the imaging unit 101, and starts capturing the image of a body (step S101). When image data is generated, the imaging unit 101 transmits the generated image data to the biometric information extraction unit 105.

Next, the biometric information extraction unit 105 extracts biometric information from the transmitted image data (step S103), and transmits the same to the authentication request unit 111.

Furthermore, the identification information extraction unit 109 to which a specific signal has been transmitted from the input unit 119 sets a specific condition based on the installation environment or the like of the service providing device 10, and extracts identification information satisfying the condition from the service providing history information (step S105). When the extraction of the identification information from the service providing history information stored in the storage unit 107 or the like is completed, the identification information extraction unit 109 transmits the extracted identification information to the authentication request unit 111.

When the biometric information is transmitted from the biometric information extraction unit 105 and the identification information are transmitted from the identification information extraction unit 109, the authentication request unit 111 collectively transmits these biometric information and identification information to the biometric information authentication server 20, and requests the authentication of the biometric information (step S107).

The authentication request acquisition unit 201 of the biometric information authentication server 20 acquires the authentication request transmitted from the service providing device 10, transmits the identification information included in the authentication request to the template acquisition unit 203, and at the same time, transmits the biometric information included in the authentication request to the biometric authentication unit 205.

The template acquisition unit 203 acquires a template from the biometric information management server 14 based on the identification information transmitted from the authentication request acquisition unit 201 (step S109), and transmits the acquired template to the biometric authentication unit 205.

The biometric authentication unit 205 performs authentication of the biometric information transmitted from the authentication request acquisition unit 201 based on the template transmitted from the template acquisition unit 203 (step S111). In case the result of the authentication process was a success of the authentication of the biometric information (step S113), the biometric authentication unit 205 transmits to the authentication result transmitting unit 207 a notification that the authentication has succeeded and the identification information associated with the template which has matched the biometric information. The authentication result transmitting unit 207 transmits the information indicating the authentication result and the identification information which have been transmitted from the biometric authentication unit 205 to the service providing device 10 which has made the authentication request.

On the other hand, in case the result of the authentication process was a failure of the authentication of the biometric information (step S113), the biometric authentication unit 205 notifies the template acquisition unit 203 that the template did not match the biometric information. Then, the template acquisition unit 203 acquires from the biometric information management server 14 a template other than the template transmitted first to the biometric authentication unit 205 (step S115), and transmits the same to the biometric authentication unit 205.

Then, the biometric authentication unit 205 subsequently performs the authentication process of the biometric information transmitted from the authentication request acquisition unit 201 based on the template newly transmitted from the template acquisition unit 205 (step S117). The biometric authentication process at this stage is an authentication process using the template other than the template corresponding to the identification information which had been transmitted from the service providing device 10.

When an authentication result is established, the biometric authentication unit 205 transmits the obtained authentication result to the authentication result transmitting unit 207. Also, in case the established authentication result indicates the authentication success, identification information associated with the template which has matched the biometric information is transmitted to the authentication result transmitting unit 207.

Then, the authentication result transmitting unit 207 transmits the information indicating the authentication result transmitted from the biometric authentication unit 205 to the service providing device 10 which has made the authentication request. Also, in case the authentication result transmitted from the biometric authentication unit 205 indicates the authentication success, the authentication result transmitting unit 207 also transmits the identification information associated with the template which has matched the biometric information.

The authentication result acquisition unit 113 of the service providing device 10 acquires the information relating to the authentication result transmitted from the biometric information authentication server 20, and checks the authentication result transmitted from the biometric information authentication server 20 (step S119). In case an authentication result that the authentication has failed has been transmitted, the authentication result acquisition unit 113 stops the service providing process.

On the other hand, in case an authentication result that the authentication has succeeded has been transmitted, the authentication result acquisition unit 113 transmits a notification that the authentication has succeeded to the service providing unit 115. Also, the authentication result acquisition unit 113 transmits the identification information associated with the template for which the authentication has succeeded to the history information update unit 117.

When the service providing unit 115 is notified by the authentication result acquisition unit 113 that the authentication has succeeded, the service providing unit 115 provides the service which is the function of the service providing device 10 to the user with whom the identification information corresponding to the template for which the authentication has succeeded is associated (step S121). Also, in case the service providing device 10 includes in the service providing history information an item relating to the content of the provided service, the service providing unit 115 notifies the history information update unit 117 of the content of the service provided to the user for whom the authentication has succeeded.

Subsequently, the history information update unit 117 updates the content described in the service providing history information based on the information transmitted from the authentication result acquisition unit 113 and the information transmitted from the service providing unit 115 (step S123).

As described above, the service providing device 10 according to the present embodiment stores and manages, by itself, identification information of a user for whom the authentication has succeeded and to whom a service was provided, and transmits, at the time of an authentication request, the identification information that it manages to the biometric information authentication server 20 together with biometric information. The biometric information authentication server 20 can shorten the processing time of one-to-N authentication using a server by preferentially processing the pieces of identification information transmitted from the service providing device 10. Also, since the biometric information authentication server 20 does not manage data such as the content of provided service, and the usage frequency and the usage time of a user, even if the number N of users increases, the data increase at the server is small, thereby enabling to reduce the burden on the authentication server.

<Hardware Configuration>

Next, the hardware configuration of the service providing device 10 according to the embodiment of the present invention will be described in detail with reference to FIG. 8. FIG. 8 is a block diagram for illustrating the hardware configuration of the service providing device 10 according to the embodiment of the present invention.

The service providing device 10 includes, in addition to the imaging unit 101, a CPU 901, a ROM 903, and a RAM 905. Furthermore, the service providing device 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the service providing device 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the service providing device 10. Furthermore, the input device 915 generates an input signal based on, for example, information which is input by a user with the above operation means, and is configured from an input control circuit for outputting the input signal to the CPU 901. The user of the service providing device 10 can input various data to the service providing device 10 and can instruct the service providing device 10 to perform processings by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the service providing device 10. More specifically, the display device displays, in the form of texts or images, a result obtained by various processes performed by the service providing device 10. On the other hand, the audio output device converts an audio signal such as reproduced audio data and sound data into an analog signal, and outputs the analog signal.

The storage device 919 is a device for storing data configured as an example of a storage unit of the service providing device 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the service providing device 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a memory stick, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the service providing device 10. Examples of the connection port 923 include a USB (Universal Serial Bus) port, an IEEE1394 port such as i.Link, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the service providing device 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth, a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the service providing device 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Also, the hardware configuration of the biometric information authentication server 20 according to the embodiment of the present invention is the same as the hardware configuration of the service providing device 10 according to the embodiment of the present invention, and thus, detailed description thereof will be omitted.

<Conclusion>

As described above, the service providing device 10 according to the embodiment of the present invention stores and manages, by itself, identification information for identifying the user to whom it has provided a service. At the time of providing a service, the service providing device 10 selects as appropriate a condition suited for itself, searches and extracts pieces of identification information that are stored and managed, and transmits the extracted pieces of identification information to the biometric information authentication server 20 together with biometric information. This makes it possible for the service providing device 10 to set a collation order suitable for the processing by itself, and the time taken for authentication can be shortened and data to be managed by the biometric information authentication server 20 can be reduced. As a result, even if the number N of registered users becomes significantly large, the increase of burden on the server can be prevented. Also, since the biometric information authentication server 20 does not have to store and manage information relating to the collation order of templates, the biometric information authentication server 20 can easily handle the situation even if the number of the service providing devices 10 is increased or decreased. Thus, the maintenance of the biometric information authentication server 20 becomes extremely easy.

Also, according to the embodiment of the present invention, data that is used at the time of determining the collation order of templates is stored and managed by each service providing device 10 as the service providing history information. Thus, even if the service providing history information becomes unable to be used at a service providing device 10 for some reason, this will not affect the entire service providing system 1, and the operational status of the entire system can be maintained.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-093408 filed in the Japan Patent Office on Apr. 7, 2009, the entire content of which is hereby incorporated by reference.

What is claimed is:

1. A service providing device comprising:
    a biometric information extraction unit for extracting biometric information, which is information unique to a living body, from living body image data obtained by capturing an image of a part of the living body;
    an authentication request unit for transmitting the biometric information extracted by the biometric information extraction unit and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information;

a service providing unit for providing a specific service to a user according to an authentication result for the biometric information;

a storage unit for storing service providing history information including identification information for identifying a user to whom a service has been provided, information relating to the type of service provided, and at least one of information relating to time at which the service has been provided and a number of times services have been provided; and an identification information extraction unit for searching through the service providing history information based on a specific condition, and for extracting at least a piece of identification information satisfying the specific condition, wherein the identification information extraction unit takes into consideration the type of service provided in the past, and wherein the authentication request unit transmits the at least a piece of identification information extracted by the identification information extraction unit to the biometric authentication server as the collation order information.

2. The service providing device according to claim 1, further comprising: a history information update unit for updating, in case authentication of biometric information has succeeded, the service providing history information of the identification information associated with the biometric information for which the authentication has succeeded.

3. The service providing device according to claim 2, wherein the identification information extraction unit searches for the identification information in accordance with a frequency of service provision to a user determined based on the service providing history information.

4. The service providing device according to claim 2, wherein provided service information, which is information indicating a content of a provided service, is further associated with the identification information recorded in the service providing history information, and wherein the identification information extraction unit searches for the identification information based on the provided service information.

5. The service providing device according to claim 3, wherein provided service information, which is information indicating a content of a provided service, is further associated with the identification information recorded in the service providing history information, and wherein the identification information extraction unit searches for the identification information based on the provided service information.

6. The service providing device according to claim 3, wherein the identification information extraction unit searches for the identification information based on a time slot in which a service provision request was made, and extracts the identification information corresponding to a user for whom a service providing frequency in the time slot is high.

7. A service providing method comprising the steps of: extracting biometric information, which is information unique to a living body, from living body image data obtained by capturing an image of a part of the living body; searching through, based on a specific condition, service providing history information in which identification information for identifying a user to whom a service has been provided and at least one of information relating to time at which the service has been provided and a number of times services have been provided are recorded in association with each other, and extracting the identification information satisfying the specific condition; transmitting the extracted biometric information and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and requesting the authentication of the extracted biometric information; and providing a specific service to a user according to an authentication result for the biometric information.

8. A non-transitory, computer-readable medium comprising instructions for causing a computer to realize:

a biometric information extraction function of extracting biometric information, which is information unique to a living body, from living body image data obtained by capturing an image of a part of the living body;

an authentication request function of transmitting the biometric information extracted by the biometric information extraction function and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information;

a service providing function of providing a specific service to a user according to an authentication result for the biometric information;

a storage function of storing service providing history information in which identification information for identifying a user to whom a service has been provided and at least one of information relating to time at which the service has been provided and a number of times services have been provided are recorded in association with each other; and an identification function of searching through the service providing history information based on a specific condition, and for extracting at least a piece of identification information satisfying the specific condition, wherein the identification function takes into consideration the type of service provided in the past, and wherein the authentication request function transmits the at least a piece of identification information to the biometric authentication server as the collation order information.

9. A biometric information authentication server comprising:

an authentication request acquisition unit for acquiring an authentication request for biometric information, which is information unique to a living body, from an external device;

a template acquisition unit for acquiring at least one template, which is registered biometric information registered in advance to be collated with the biometric information included in the acquired authentication request, based on collation order information, which is information relating to a collation order of the at least one template, included in the authentication request;
a biometric authentication unit for performing authentication of the biometric information based on the at least one template transmitted from the template acquisition unit;
a storage unit for storing service providing history information in which identification information for identifying a user to whom a service has been provided and at least one of information relating to time at which the service has been provided and a number of times services have been provided are recorded in association with each other;
an identification information extraction unit for searching through the service providing history information based on a specific condition, and for extracting at least a piece of identification information satisfying the specific condition, wherein the identification information extraction unit takes into consideration the type of service provided in the past, and wherein the authentication request unit transmits the at least a piece of identification information extracted by the identification information extraction unit to the biometric authentication server as the collation order information; and
an authentication result transmitting unit for transmitting an authentication result by the biometric authentication unit to the external device which has made the authentication request.

10. The biometric information authentication server according to claim 9, wherein the collation order information is at least a piece of identification information for identifying a user, wherein the template acquisition unit acquires, in case the biometric authentication unit has failed in authentication by the template acquired based on the identification information included in the authentication request, a template other than the template corresponding to the identification information, and wherein the biometric authentication unit performs authentication of the biometric information by using the template other than the template corresponding to the identification information.

11. A biometric information authentication method comprising the steps of:
acquiring an authentication request for biometric information, which is information unique to a living body, from an external device;
acquiring at least one template, which is registered biometric information registered in advance to be collated with the biometric information included in the acquired authentication request, based on collation order information, which is information relating to a collation order of the at least one template, included in the authentication request;
performing authentication of the biometric information by using the at least one template acquired based on the collation order information;
providing history information in which identification information for identifying a user to whom a service has been provided and at least one of information relating to time at which the service has been provided and a number of times services have been provided are recorded in association with each other;
searching through the service providing history information based on a specific condition, and for extracting at least a piece of identification information satisfying the specific condition, wherein searching comprises taking into consideration the type of service provided in the past, and transmitting the at least a piece of identification information to the biometric authentication server as the collation order information; and
transmitting an authentication result for the biometric information to the external device which has made the authentication request.

12. A non-transitory, computer-readable medium comprising instructions for causing a computer to realize:
an authentication request acquisition function of acquiring an authentication request for biometric information, which is information unique to a living body, from an external device;
a template acquisition function of acquiring at least one template, which is registered biometric information registered in advance to be collated with the biometric information included in the acquired authentication request, based on collation order information, which is information relating to a collation order of the at least one template, included in the authentication request;
a biometric authentication function of performing authentication of the biometric information by using the at least one template acquired based on the collation order information;
a storage function of storing service providing history information in which identification information for identifying a user to whom a service has been provided and at least one of information relating to time at which the service has been provided and a number of times services have been provided are recorded in association with each other;
an identification function of searching through the service providing history information based on a specific condition, and for extracting at least a piece of identification information satisfying the specific condition, wherein the identification function takes into consideration the type of service provided in the past, and wherein the authentication function includes transmitting the at least a piece of identification information to the biometric authentication server as the collation order information; and
an authentication result transmitting function of transmitting an authentication result by the biometric authentication function for the biometric information to the external device which has made the authentication request.

13. A service providing system comprising a service providing device including:
a biometric information extraction unit for extracting biometric information, which is information unique to a living body, from living body image data obtained by capturing an image of a part of the living body,
an authentication request unit for transmitting the biometric information extracted by the biometric information extraction unit and collation order information, which is information relating to an order of collating at least a piece of registered biometric information registered in advance with the biometric information at a time of authentication of the biometric information, to a biometric authentication server for authenticating the biometric information based on the at least a piece of registered biometric information registered in advance, and for requesting the authentication of the extracted biometric information,
a service providing unit for providing a specific service to a user according to an authentication result for the biometric information;
a biometric information authentication server including an authentication request acquisition unit for acquiring an authentication request for the biometric information from the service providing device, a template acquisition unit for acquiring at least one template, which is registered biometric information registered in advance to be collated with the biometric information included in the acquired authentication request, based on collation order information, which is information relating to a collation order of the at least one template, included in the authentication request, a biometric authentication unit for performing authentication of the biometric information based on the at least one template transmitted from the template acquisition unit, a storage unit for storing service providing history information in which identification information for identifying a user to whom a service has been provided and at least one of information relating to time at which the service has been provided and a number of times services have been provided are recorded in association with each other;

an identification information extraction unit for searching through the service providing history information based on a specific condition, and for extracting at least a piece of identification information satisfying the specific condition, wherein the identification information extraction unit takes into consideration the type of service provided in the past, and wherein the authentication request unit transmits the at least a piece of identification information extracted by the identification information extraction unit to the biometric authentication server as the collation order information; and an authentication result transmitting unit for transmitting an authentication result by the biometric authentication unit to the service providing device which has made the authentication request.

* * * * *